US009140419B2

(12) United States Patent
Walker

(10) Patent No.: US 9,140,419 B2
(45) Date of Patent: Sep. 22, 2015

(54) LIGHTED CUP HOLDER AND LIGHTING METHOD

(71) Applicant: Custom Molded Products, Inc., Newnan, GA (US)

(72) Inventor: Victor L. Walker, Temecula, CA (US)

(73) Assignee: Custom Molded Products, Inc., Newnan, GA (US)

( * ) Notice: Subject to any disclaimer, the term of this patent is extended or adjusted under 35 U.S.C. 154(b) by 18 days.

(21) Appl. No.: 14/077,432

(22) Filed: Nov. 12, 2013

(65) Prior Publication Data

US 2015/0131272 A1 May 14, 2015

(51) Int. Cl.

| | |
|---|---|
| ***B60Q 3/06*** | (2006.01) |
| ***F21S 8/00*** | (2006.01) |
| ***F21V 5/04*** | (2006.01) |
| ***F21V 31/04*** | (2006.01) |

(52) U.S. Cl.
CPC ... *F21S 8/00* (2013.01); *F21V 5/04* (2013.01); *F21V 31/04* (2013.01)

(58) Field of Classification Search
CPC .................. F21W 2131/308; F21W 2131/401; B60Q 3/0243; Y10S 224/926; A47G 23/0309
See application file for complete search history.

(56) References Cited

U.S. PATENT DOCUMENTS

| | | | | |
|---|---|---|---|---|
| 5,575,553 | A * | 11/1996 | Tipton | 362/101 |
| 6,065,848 | A * | 5/2000 | Tucker et al. | 362/101 |
| 6,793,363 | B2 * | 9/2004 | Jensen | 362/101 |
| 2003/0076672 | A1 * | 4/2003 | Head | 362/101 |
| 2007/0001613 | A1 * | 1/2007 | Hulse | 313/634 |
| 2008/0098509 | A1 * | 5/2008 | Kantor et al. | 4/541.1 |
| 2010/0315826 | A1 * | 12/2010 | Anderson et al. | 362/511 |
| 2011/0047841 | A1 * | 3/2011 | Senkyr et al. | 40/575 |
| 2012/0002400 | A1 * | 1/2012 | Lindholm | 362/101 |

* cited by examiner

*Primary Examiner* — Julie Bannan
(74) *Attorney, Agent, or Firm* — Laurence P. Colton; Smith Risley Tempel Santos LLC

(57) ABSTRACT

A lighted cup holder and method for illuminating a cup holder, the cup holder having a base component having a cylindrical body for mounting through a spa shell, a first end, a second end, and a hollow interior; a lens or light diffuser at the first end of the body and located proximal to an exterior surface of the spa shell; a decorative or functional stencil or insert located within the hollow interior at or proximal to the first end of the body; a light source; and a light holder for retaining the light source on the base component at or proximal to the second end of the body.

18 Claims, 9 Drawing Sheets

LIGHTED CUP HOLDER AND LIGHTING METHOD

BACKGROUND OF THE INVENTION

1. Technical Field

The present invention generally is in the field of lighting devices and methods for spas, swimming pools, hot tubs, garden baths, and the like. The present invention more particularly is in the field of lighting devices and methods for illuminating cup holders and cup holder areas for spas, swimming pools, hot tubs, garden baths, and the like. The present invention more particularly also is in the field of lighting devices and methods for generating aesthetically pleasing light in, on, and around cup holders and cup holder areas for spas, swimming pools, hot tubs, garden baths, and the like. The present invention more particularly also is in the field of lighting devices and lighting methods having a permanent, semi-permanent, or non-permanent lighted cup holder base with removable and replaceable inserts having different aesthetic designs and shapes.

2. Prior Art

Few applications derive more benefit from the addition of aesthetically pleasing and/or safety lighting than artificial bodies of water such as spas, swimming pools, hot tubs, garden baths, and the like. The popularity of lighting features and methods of lighting and/or illuminating the interior, exterior, and features of such structures is probably associated with the numerous aesthetic and practical applications that make lighting desirable. For example, the addition of a lighting feature or the illumination of already present on or features added to such structures can provide a substantial decorative effect to, or can provide a relaxing background visual experience for, or can provide for increased safety when using, such structures. As such, users and owners of such structures, which include all such artificial bodies of water as well as many natural bodies of water, often desire the addition of lighting features to and methods of lighting or illuminating such structures.

Many existing spas, swimming pools, hot tubs, garden baths, and the like include some type of lighting feature to add to the aesthetics of the device. In some existing spas, swimming pools, hot tubs, garden baths, and the like, the lighting feature is located on a feature of the device, such as on a waterfall or waterjet, for providing an aesthetically pleasing water flow. In other existing spas, swimming pools, hot tubs, garden baths, and the like, the lighting feature is located on the decking or the exterior of such structures or as separate lighting devices, such as lamps, for providing ambient lighting or safety lighting. In yet other existing spas, swimming pools, hot tubs, garden baths, and the like, the lighting feature is located within the tub of water, also for providing ambient lighting and safety lighting. As the market for spas, swimming pools, hot tubs, garden baths, and the like grows, users desire more, different, better, more interesting, and more aesthetically pleasing lighting devices and methods of lighting to make, for example, their bathing experience more relaxing, more convenient, and safer.

Accordingly, there is a need for new and different lighting devices and methods for illuminating cup holders and cup holder areas of spas, swimming pools, hot tubs, garden baths, and the like, and for lighting devices and methods for generating aesthetically pleasing light in, on and around cup holders and cup holder areas of spas, swimming pools, hot tubs, garden baths, and the like. There also is a need for new and different lighting devices and methods for illuminating cup holders and cup holder areas of spas, swimming pools, hot tubs, garden baths, and the like, and for lighting devices and methods for generating aesthetically pleasing light in, on and around cup holders and cup holder areas of spas, swimming pools, hot tubs, garden baths, and the like having a permanent or semi-permanent lighted cup holder base with removable and replaceable inserts having different aesthetic designs and shapes. There is a further need for new and different lighting devices and methods for illuminating cup holders and cup holder areas of spas, swimming pools, hot tubs, garden baths, and the like, and for lighting devices and methods for generating aesthetically pleasing light in, on and around cup holders and cup holder areas of spas, swimming pools, hot tubs, garden baths, and the like having a permanent or semi-permanent lighted cup holder base with removable and replaceable inserts whereby the spa, swimming pool, hot tub, garden bath, or the like can be customized by the owner. It is to these needs and others that the present invention is directed.

BRIEF SUMMARY OF THE INVENTION

In the present specification, spas, swimming pools, hot tubs, garden baths, saunas, or the like, including artificial water structures, all will be referred to as a “spa” or “spas”.

Briefly, the invention is a lighted cup holder for placement on or through a spa shell, and preferably on or through the area of the spa shell located within a cup holder area formed in the spa shell, comprising an insert within the cup holder and not subject to the harsh chemical, temperature, and moisture environment of the spa. Spas often are manufactured with cup holders or cup holder areas, which, in many designs, are cup-shaped indentations in the spa shell. The light provided for by the invention can be for aesthetic purposes, such as ambient, decorative, architectural, or mood lighting, or for safety purposes, so one can find the cup holder for safe placement of a cup within the cup holder. The insert provided for by the invention addresses the lack in the current state of the art in providing a solution for shading or branding a spa that can stand the rigors of the spa environment. For example, the insert provided for by the invention provides spa manufacturers and sales outlets an opportunity to include a long lasting branding solution in the highly used cup holder area. The spa industry in general struggles with long lasting brand identity, which is borne out by the fact that many consumers forget what brand of hot tub they own shortly after purchase. Alternatively, the insert provided for by the invention also can function in a purely aesthetic manner.

The present invention comprises a structured or molded base component having a cylindrical body that is mounted through the spa shell a lens or light diffuser at a first end of the body, a nut for securing the base component on the spa shell, a decorative or functional stencil or insert, a light source, and a light holder for retaining the light source on the base component. The base component preferably is a one piece component formed at least partially out of a transparent, semi-transparent, or translucent material capable of transmitting light. The base component comprises a generally planar lens or light diffuser component attached normal to the first end of the generally hollow generally cylindrical body. A second end of the body preferably allows access to the generally hollow interior of the base component. The base component bears a resemblance to an inverted cup.

The body preferably has a diameter that matches or is smaller than the diameter of a hole cut through the cup holder area whereby the body can be inserted through the hole for securing on the spa shell. The body also preferably has a diameter that matches the diameter of a light holder whereby the light holder can be easily and securely attached to the open second end of the body. The lens or light diffuser allows the transmission of light from the light source to the exterior of the spa, through the lens or light diffuser and into the cup holder area on the exterior of the spa.

The decorative or functional stencil or insert provides decoration or functional information to the cup holder. The insert is placed within the hollow interior of the body so that it is located preferably at or up against the interior side of the lens or light diffuser. One advantage of having the insert within the hollow interior is that, unlike the current state of the art, within the hollow interior, the insert would not be exposed to the harsh environment of the spa. The insert may be a stencil having light transmitting portions and light opaque portions, or first color portion and second color portion, so as to present a design or information when light from the light source is shone through or against the insert.

The light holder is for holding a light source, such as a light emitting diode (LED) or other light emitting device, and can be attached to the base component also via threads, or by friction couplings or adhesives. Light holder has a tubular structure for containing and/or supporting the light source. The tubular structure is structured to contain the light source and any of the necessary wires, batteries, or other means for supplying electricity or other power to the light source. Light holder can be configured such that light from the light source is more efficiently provided to lens or light diffuser through the hollow interior of the body.

When the invention is mounted on the spa shell, the second end of the body is located within the spa shell enclosure and the first end of the body is located external to and proximal to the spa shell. Sealing gaskets and/or a decorative trim ring may be placed over the body and juxtaposed against the rear of the lens or light diffuser. The body with the trim ring and/or gaskets is inserted through a cooperating hole through the spa shell, with the trim ring and/or gaskets remaining on the external side of the spa shell. The nut then is screwed onto or otherwise attached to the body whereby, for example, the spa shell is sandwiched between the nut and the mounting surface and/or the gasket and/or the trim ring. The insert may be placed within the body preferably before the body is mounted on the spa shell, or after the body is mounted on the spa shell.

The light holder is attached to the second end of the body, preferably by the cooperating screw threads and threaded portion, but alternatively by a friction coupling or adhesives. A light source is placed within the tubular structure of the light holder either before or after the light holder is attached to the body. The light source is attached to a power source.

The cup holder can be used on almost any artificial water body so as to provide for the addition of aesthetically pleasing, decorative, architectural, informational, and/or safety light to a spa or the area surrounding a spa.

These features, and other features and advantages of the present invention will become more apparent to those of ordinary skill in the relevant art when the following detailed description of the preferred embodiments is read in conjunction with the appended drawings in which like reference numerals represent like components throughout the several views.

DETAILED DESCRIPTION OF THE PREFERRED EMBODIMENTS

Figure 1:
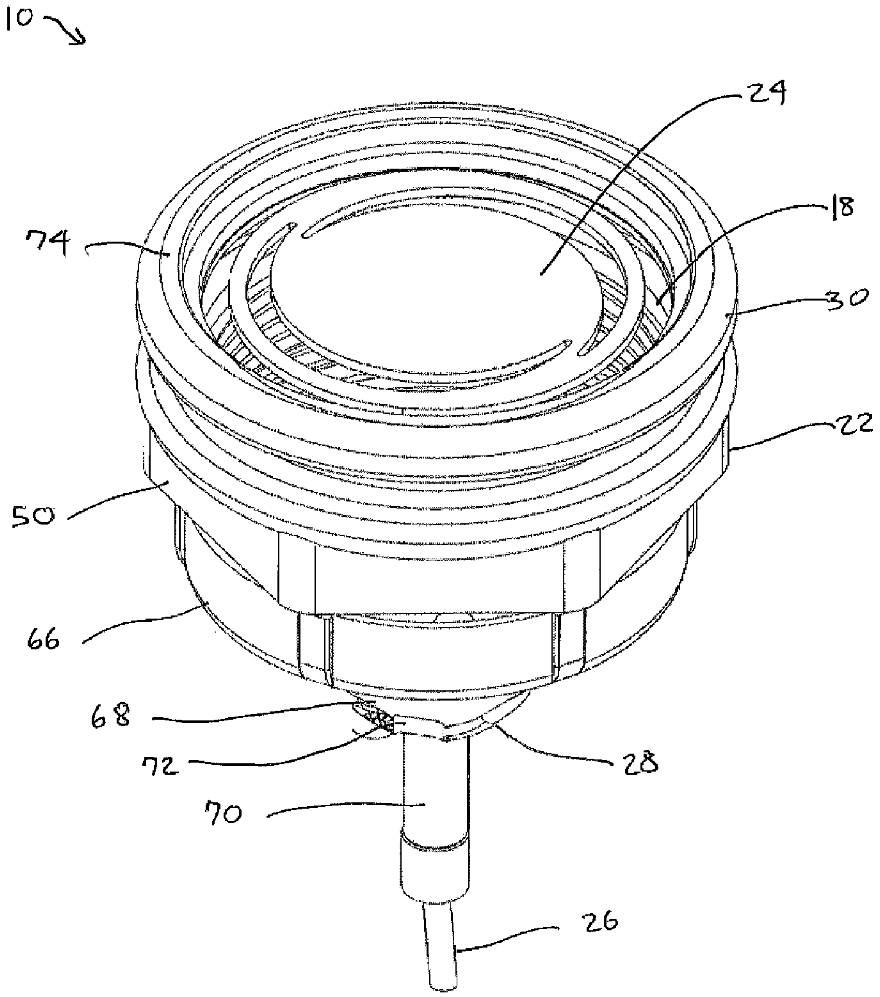
FIG. 1 is a perspective side view of an embodiment of the invention.
Figure 2:
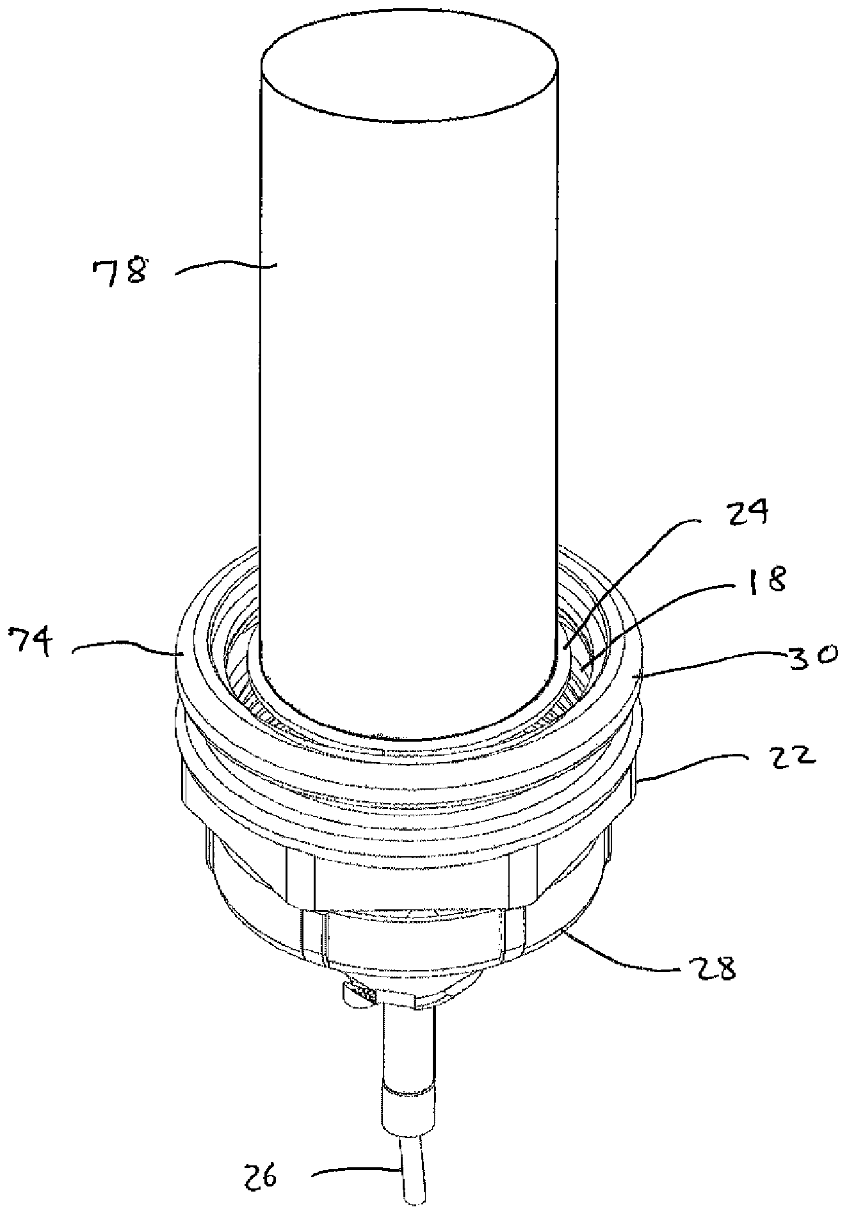
FIG. 2 is a perspective side view of an embodiment of the invention with a cup sitting thereon.
Figure 3:
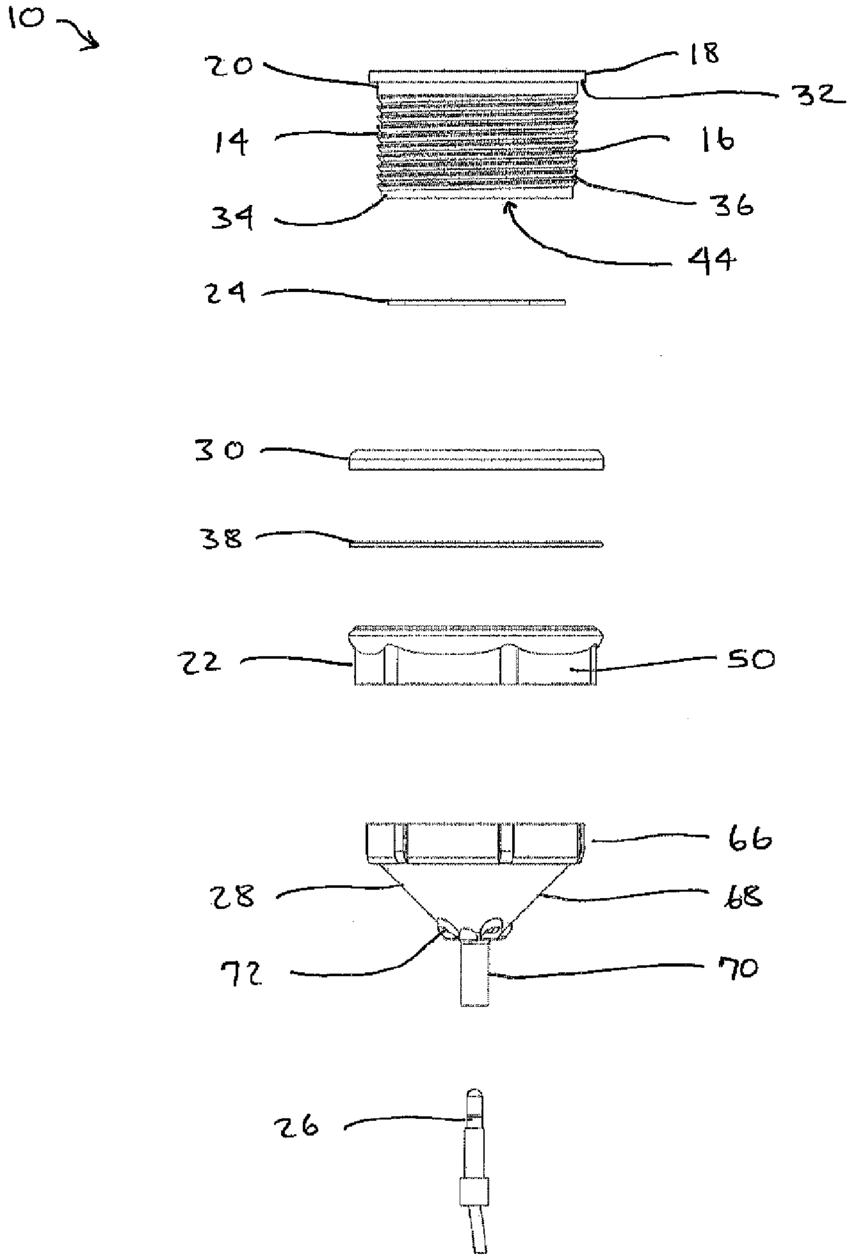
FIG. 3 is an exploded side view of an embodiment of the invention.
Figure 4:
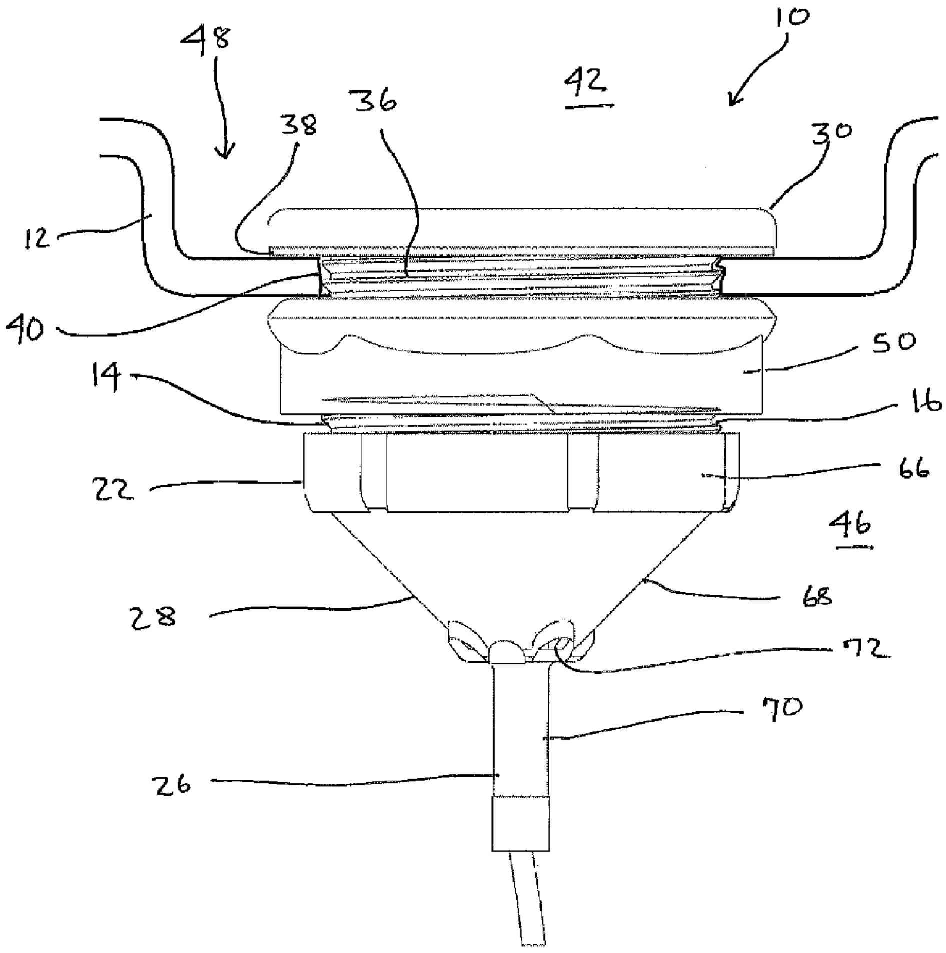
FIG. 4 is an unexploded side view of an embodiment of the invention.
Figure 5:
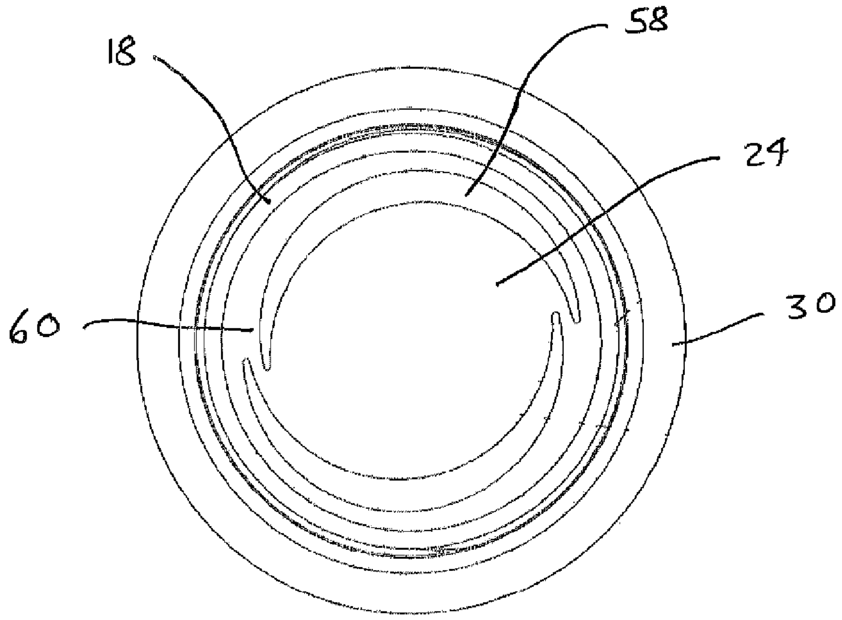
FIG. 5 is a top view of an embodiment of the invention.
Figure 6:
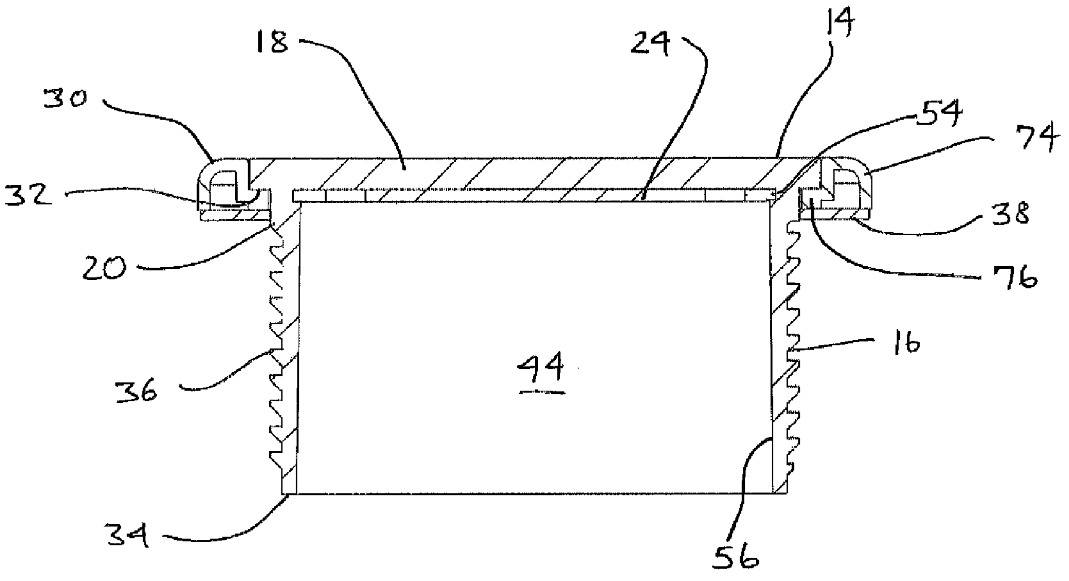
FIG. 6 is a sectional side view of a base component of an embodiment of the invention.
Figure 7:
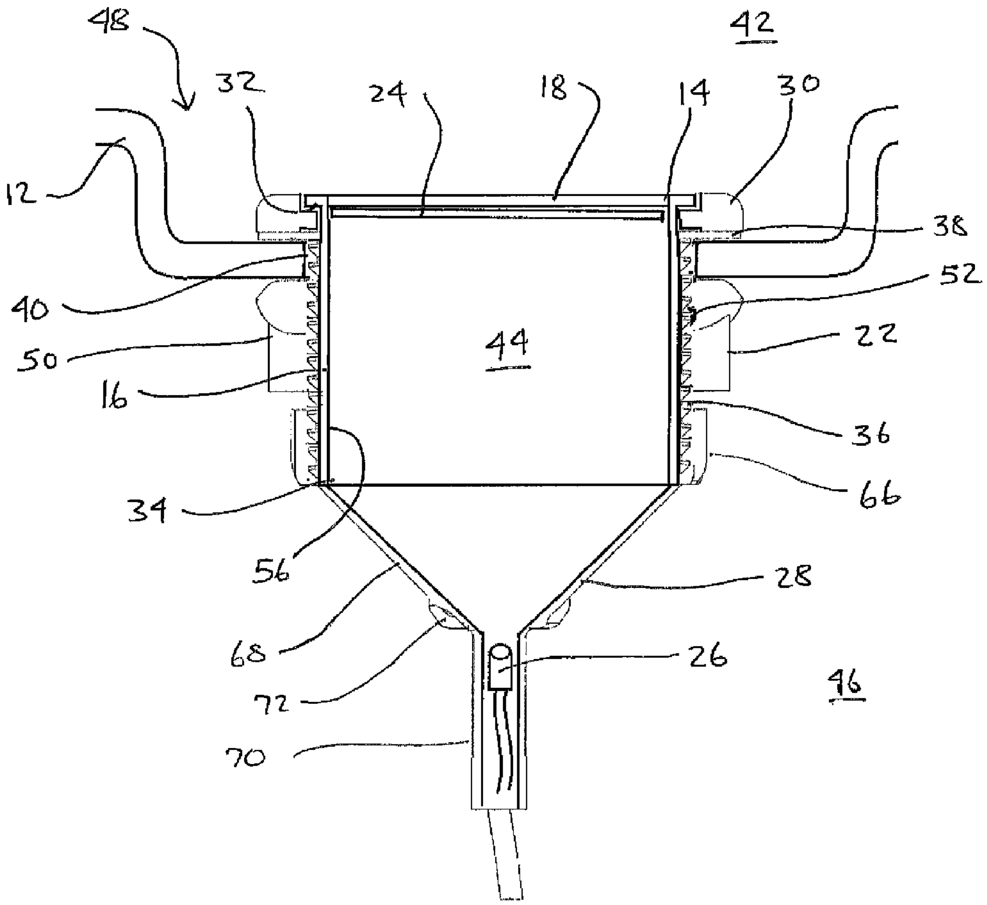
FIG. 7 is a sectional side view of an embodiment of the invention mounted on a spa shell.
Figure 8:
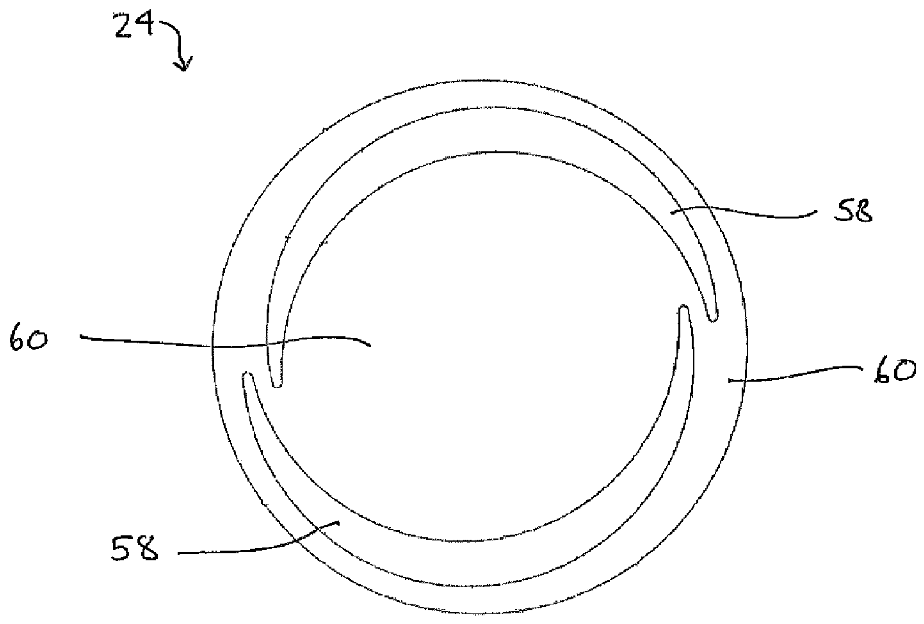
FIG. 8 is a top view of an embodiment of an insert for the invention.
Figure 9:
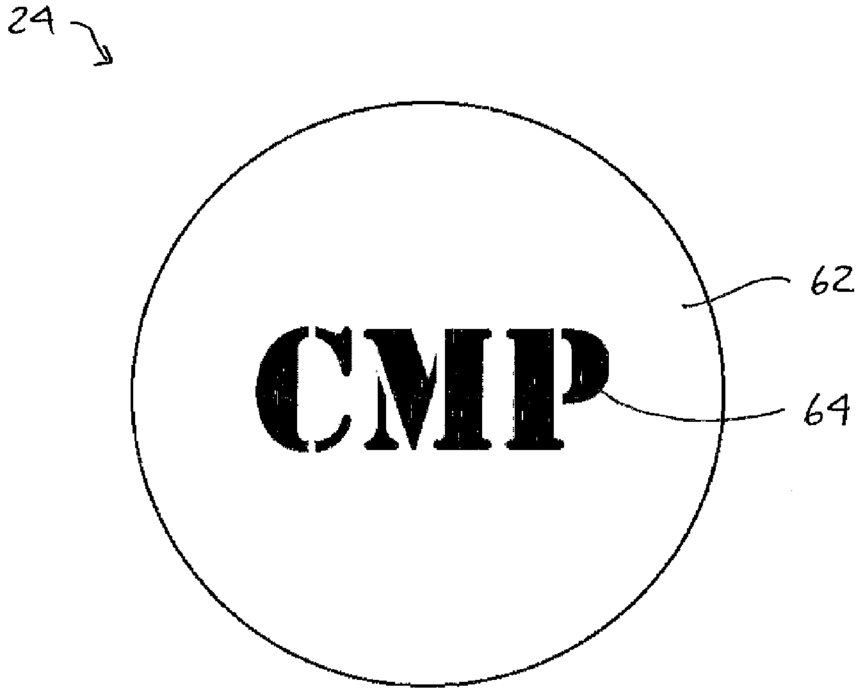
FIG. 9 is a top view of an embodiment of an insert for the invention.

Illustrative embodiments of a lighted cup holder 10 according to the present invention are shown in FIGS. 1 through 11. FIG. 1 is a perspective side view of an embodiment of the invention and FIG. 2 is a perspective side view of an embodiment of the invention with a cup 78 sitting thereon. FIG. 3 is an exploded side view of an embodiment of the invention in preparation for installation on a spa shell 12. FIG. 4 is an unexploded side view of an embodiment of the invention installed on a spa shell 12. FIG. 5 is a top view of an embodiment of the invention. FIG. 6 is a sectional side view of a base component 14 of an embodiment of the invention. FIG. 7 is a sectional side view of an embodiment of the invention mounted on a spa shell 12. FIGS. 8 and 9 are top views of embodiments of an insert 24 for the invention.

The present invention is a lighted cup holder 10 for placement on or through a spa shell 12, and preferably on or through the area of the spa shell 12 located within a cup holder area 48 formed in the spa shell 12. In preferred embodiments, the present invention provides light or illumination for the bottom of the cup holder 10, the cup holder area 48, and/or the cup and liquid in the cup. The light provided for by the invention can be for informational purposes, such as branding or advertising by the spa manufacturer or sales outlet, for aesthetic purposes, such as ambient, decorative, architectural, or mood lighting, or for safety purposes, so one can find the cup holder 10 for safe placement of a cup within the cup holder 10.

Spas often are manufactured with cup holders or cup holder areas 48. In many designs, these cup holder areas 48 are cup-shaped indentations in the spa shell 12, usually on a horizontal portion of the spa shell 12. For free-standing spas, the cup-holder indentations can be on the upper horizontal portion of the spa shell 12 between and connecting the spa tub interior and the spa exterior wall. For built-in spas, the cup-holder indentations can be on a horizontal portion of the spa shell 12 proximal to the decking in which the spa is installed. Such cup holders areas 48 also can be of any desired size, and formed and located in any part of the spa.

In preferred embodiments, the present invention comprises a structured or molded base component 14 having a cylindrical body 16 that is mounted through the spa shell 12, a lens or light diffuser 18 at a first end 20 of the body 16, a nut 22 for securing the base component 14 on the spa shell, a decorative or functional stencil or insert 24, a light source 26, and a light holder 28 for retaining the light source 26 on the base component 14. The present invention also can comprise a decorative trim ring 30, and various other nuts, clips, gaskets 38, washers, and connecting components, such as mechanical and electrical components for holding the cup holder 10 securely onto the spa shell 12 and for providing power to the light source 26, as may be required for proper, desired, or optimal function of the invention.

The base component 14 preferably is a one piece component and preferably is formed at least partially out of a transparent, semi-transparent, or translucent material capable of transmitting light. The base component 14 comprises a generally planar lens or light diffuser 18 component attached normal to the first end 20 of the generally hollow generally cylindrical body 16, thereby closing the first end 20 and forming a closed end. The lens or light diffuser 18 also acts as the base, support, or platform on which a cup 78 is placed. A second end 34 of the body 16 preferably is open, allowing access to the generally hollow interior 44 of the base component 14. The exterior surface of the body 16 preferably has a thread 36 or threaded surface over at least a portion of the exterior surface for cooperating with the nut 22 for securing the cup holder 10 onto the spa shell 12 and/or for cooperating with the light holder 28 for securing the light holder 28 onto the body 16. Thus, overall, the base component 14 bears a resemblance to an inverted cup, having a cylindrical body 16, a closed top or first end 20, an open bottom or second end 34, and an at least partially threaded exterior surface.

The body 16 can comprise a circumferential slot or notch 54 located on the inner surface 56 of the hollow interior 44. Slot or notch 54 preferably is located at the first end 20 of the body 16 juxtaposed to the lens or light diffuser 18. Slot or notch 54 preferably is located along the entire inner circumference of the body 16 and has a depth up to approximately 1/16" and a height equal to or slightly greater than the thickness of the decorative or functional stencil or insert 24, as disclosed herein, which also is approximately 1/16". The parameter of 1/16" is illustrative only, and can be increased or decreased depending on the insert 24. A range of up to 1/8" for both the depth and height of the slot or notch 54 should satisfy most sizes of desirable inserts 24.

The body 16 preferably has a diameter that matches or is smaller than the diameter of a hole 40 cut through the cup holder area 48 whereby the body 16 can be inserted through the hole 40 for securing on the spa shell 12. Similarly, the body 16 also preferably has a diameter that matches the diameter of a light holder 28 whereby the light holder 28 can be easily and securely attached to the open second end 34 of the body. Thus, the body 16 can be made to have a diameter that can cooperate with the diameter of an already present hole 40 through the spa shell 12 or a hole 40 can be made of a diameter that will cooperate with the diameter of the body 16.

The lens or light diffuser 18 allows the transmission of light from the light source 26 to the exterior 42 of the spa, through the lens or light diffuser 18 and into the cup holder area 48 on the exterior 42 of the spa. In a preferred embodiment of the base component 14, the lens or light diffuser 18 is formed as a wall closing off the first end 20 of the base component 14, and acts as the closed first end 20 of the base component 14. In this embodiment, the light source 26 generally must be replaced from the interior side 46 of the spa shell 12. Although as shown in the figures, the lens or light diffuser 18 is a circle, the lens or light diffuser 18 can be any shape such as, for example, square, oval, other polygons, and irregular polygons. For aesthetic purposes, the shape of the lens or light diffuser 18 can be made to match the shape of the cup holder area 48.

The lens or light diffuser 18 can be a permanent portion of the body 16, being molded at the same time as the body 16. The diameter or minimum planar dimension of the lens or light diffuser 18 relative to the diameter of the body 16 preferably is larger than the diameter of the body 16 whereby a mounting surface 32 is created on an underside of the lens of light diffuser 18. Generally speaking, the plane of the lens or light diffuser 18 is normal to the axial axis of the body 16.

The nut 22 for securing the base component 14 on the wall is a generally annular structure having an outer gripping surface 50 and an inner thread 52 for cooperating with the external thread 36 on the body 16. As discussed herein, the nut 22 has the screw thread 52 on an inner surface for cooperating with the external thread 36 on the body for securing the base component 14 onto the spa shell 12 whereby the spa shell 12 is sandwiched between the nut 22 and the mounting surface 32 and/or the decorative trim ring 30.

The decorative or functional stencil or insert 24 provides decoration or functional information to the cup holder 10. The insert is placed within the hollow interior 44 of the body 16 so that it is located preferably at or proximal to the first end 20 up against the interior side of the lens or light diffuser 18. The insert 24 preferably is a circular structure having a diameter approximately equal to the inner diameter of the hollow interior 44 of the body 16 and a thickness up to about 1/8". Preferably, the thickness of insert 24 is between the thickness of plastic sheeting up to about 1/8", with a thickness of 1/16" being suitable for most purposes. The insert 24 may have a diameter slightly larger than the inner diameter of the hollow interior 44 of the body 16 so that insert 24 will fit within or at least partially fit within slot or notch 54, thereby better securing insert 24 within body 16 and up against the interior side of lens or light diffuser 18.

The insert 24 may be a stencil having light transmitting portions 58 and light opaque portions 60, or first color portion 62 and second color portion 64, so as to present a design or information when light from the light source 26 is shone through or against the insert 24. For example, as light from the light source 26 hits an insert 24 having light transmitting portion 58 and light opaque portion 60, the light will travel through the light transmitting portion 58 and be visible to the user. For another example, as light from the light source 26 travels through the first color portion 62 and the second color portion 64, designs of different colors will be visible to the user. By structuring the light transmitting portion 58, light opaque portion 60, first color portion 62, and/or second color portion 64, insert 24 can provide an aesthetic or decorative design or provide information such as a manufacturer's logo or name.

Spa water typically contains chemicals, ranging from chlorine and fluoride contained in common public water supplies to added salts and minerals, as well as cleaning and sanitizing chemicals added to a spa in preparation for and during use. Spa water typically also is heated. The combination of such chemicals and heating of the water produces a chemical and thermal environment that can be disadvantageous to spa materials, such as plastics and metals used for the spa and for added spa features. Therefore, many spa components can and do degrade when exposed to the spa environment.

One advantage of having the insert 24 within the hollow interior 44 is that within the hollow interior 44, the insert 24 is not be exposed to the harsh environment of the spa. In the present invention, the hollow interior 44 is not exposed to or in fluid communication with the spa environment. More specifically, the open second end 34 of the body 16 is located on the interior side 46 of the spa shell 12 and therefore not subject to or only minimally subject to the spa environment. As such, the hollow interior 44 is closed to the exterior 42 of the spa and open to the interior side 46 of the spa shell 12, whereby the insert 24 is not exposed to the environment present proximal to exterior 42 of the spa, and the insert 24 is not exposed to or only minimally exposed to the spa environment. As a result, the insert 24 is not subjected to the degradation, or to the full amount of degradation, caused by the spa environment to which equivalent state of the field materials and components are subjected. Therefore, the insert 24 of the present invention will have a longer lifetime, and need to be refreshed or replaced with much less frequency.

The light holder 28 is for holding a light source 26, such as a light emitting diode (LED) or other light emitting device, and can be attached to the base component 14 also via the threads 36. An illustrative embodiment of light holder 28 has a generally conical or funnel shape with a threaded portion 66, a conical portion 68, and a tubular structure 70 for containing and/or supporting the light source 28. Light holder 28 also may have drain holes 72 for allowing water that may be within the hollow interior 44 of body 16 and/or within the light holder 28 to drain. Threaded portion 66 has an outer gripping surface and an inner threaded surface for cooperating with the external thread 36 on the exterior surface of body 16. The tubular structure 70 is structured to contain the light source 26 and to allow any of the necessary wires, batteries, or other means for supplying electricity or other power to the light source 26. Thus, tubular structure 70 is designed to have a diameter suitable for use with the desired size of the light source 26. Conical portion 68 tapers from a first diameter proximal to the threaded portion 66 such that the threaded portion 66 can cooperate with the body 16 to a second diameter proximal to the tubular structure 70. Light holder 28 can be configured such that light from the light source 26 is more efficiently provided to lens or light diffuser 18 through the hollow interior 44 of the body 18, such as in a linear configuration. Other embodiments of the light holder 28 also allow for the tubular structure 70 to be in a perpendicular configuration or an angled configuration to maximize the efficiency of light transfer from the light source 26 to the lens or light diffuser 18.

The light source 26 can be LEDs, mini-bulbs, or more conventional or older bulbs. Light source 26 preferably is removable and replaceable.

The present invention also can comprise an optional decorative trim ring 30 surrounding the lens or light diffuser 18. Trim ring 30 can be placed between the mounting surface 32 of the lens or light diffuser 18 and the exterior surface 42 of the spa shell 12. Trim ring 30 can have a decorative outer circumferential portion 74 for surrounding the external circumference of the lens or light diffuser 18. Trim ring 30 also can have a mounting inner circumferential portion 76 for fitting under the mounting surface 32 of the lens or light diffuser 18 whereby the inner circumferential portion 74 is sandwiched between the mounting surface 32 and the spa shell 12 when the cup holder 10 is installed on the spa shell 12.

Trim ring 30 can be of any desired thickness, from less than that of the lens or light diffuser 18 to greater than that of the lens or light diffuser 18. A preferred thickness for the trim ring 30 is equivalent to or greater than the height that the lens or light diffuser 18 extends upwards from the exterior surface 42 of the spa shell 12. If the thickness for the trim ring 30 is equivalent to the height that the lens or light diffuser 18 extends upwards from the exterior surface 42 of the spa shell 12, then the cup holder 10 will have a slim, low profile when installed. If the thickness for the trim ring 30 is greater than the height that the lens or light diffuser 18 extends upwards from the exterior surface 42 of the spa shell 12, then the trim ring 30 can provide a curb for maintaining a cup on the cup holder 10.

The present invention also can comprise various other nuts, clips, gaskets 38 for better securing the cup holder 10 onto the spa shell 12 and for providing a water tight fitting between the cup holder 10 and the spa shell 12. For example, a first gasket 38 can be located between trim ring 30 and mounting surface 32 to prevent or reduce the amount of water passing between lens or light diffuser 18 and trim ring 30 and leaking into the interior 46 side of the spa shell 12. For another example, a second gasket can be located between the trim ring 30 and the spa shell 12 to prevent or reduce the amount of water passing between trim ring 30 and the spa shell 12 and leaking into the interior 46 side of the spa shell 12.

When the invention is mounted on the spa shell 12, the second end 34 of the body 16 is located within the spa shell 12 enclosure and the first end 20 of the body 16 is located external to and proximal to the spa shell 12. A gasket 38 may be placed over the body 16 and up against the mounting surface 32. A trim ring 30 may be placed over the body 16 and up against the gasket 38 and/or the mounting surface 32. Another gasket may be placed over the body 16 and up against the trim ring 32. The body 16 with the trim ring 30 and gaskets 38 is inserted through a cooperating hole 40 through the spa shell 12 such that the mounting surface 32 and/or gasket 38 and/or trim ring 30 lies flat against or proximal to the exterior surface 42 of the spa shell 12. The body 16 has the screw thread 36 on the outer surface for cooperating with the nut 22 for securing the base component 14 onto the spa shell 12. The nut 22 then is screwed onto to the body 16 whereby, for example, the spa shell 12 is sandwiched between the nut 22 and the mounting surface 32 and/or the gasket 38 and/or the trim ring 30.

An insert 24 is placed within the body 16 preferably before the body 16 is mounted on the spa shell 12, but may be placed within the body 16 after the body 16 is mounted on the spa shell 12. The insert 24 may be secured within the body 16 via the slot or notch 54, via preferably clear adhesives, and/or via static electricity or other known methods and means for adhesion.

The light holder 28 is attached to the second end 34 of the body 16, preferably by the cooperating screw threads 36 and threaded portion 66. A light source 26 is placed within the tubular structure 70 of the light holder 28 either before or after the light holder 28 is attached to the body 16. The light source 26 can be held within the tubular structure 70 either frictionally or with adhesive. If an adhesive is used, preferably the adhesive is a releasable adhesive so that the light source 26 can be removed and replaced if it fails or if the user wants to use a different type or color of light source 26. The light source 26 is attached to a power source.

In use, the cup holder 10 can be attached to the spa shell 12 at the manufacturing location, at the installation location, or after the spa has been installed. In an exemplary embodiment, the base component 14 is attached to the spa shell 12 by drilling a hole 40 through the spa shell 12, preferably in the previously formed cup holder area 48, placing a trim ring 30 and preferably one or more gaskets 38 over the body 16 and up against or proximal to the mounting surface 32, inserting the body 16 of the base component 14 through the hole 40 from the exterior 42 of the spa such that the mounting surface 32 and/or the trim ring 30 and/or the gaskets 38 contacts the exterior side 42 of the spa shell 12, screwing a nut 22 onto the screw thread 36 on the exterior of the body 16, and tightening the nut 22 up against the interior side 38 of the of the spa shell 12 such that the spa shell 12 is sandwiched between the nut 22 and the mounting surface 32 and/or the trim ring 30 and/or the gaskets 38. An insert 24 is placed within the body 16 preferably before the body 16 is mounted on the spa shell 12, but may be placed within the body 16 after the body 16 is mounted on the spa shell 12. The light holder 28 then is attached to the second end 34 of the body 16 and a light source 26 is inserted into the tubular structure 70 for containing and/or supporting the light source 26.

The cup holder 10 can be used on almost any artificial water body. While the cup holder 10 is described in connection with a spa, it is understood that the cup holder 10 can be used on spas, swimming pools, tubs, and the like. One of ordinary skill in the art can modify the cup holder 10 without undue experimentation so that it can be placed on almost any artificial water body. Thus, the invention can be installed on spa shell 12 to provide for the addition of aesthetically pleasing, decorative, architectural, informational, and/or safety light to a spa or the area surrounding a spa.

The various components of the invention can be manufactured from relatively inexpensive materials. Preferably, the components are molded or formed from a plastic material that will not corrode or be adversely affected from the exposure to water, particularly chlorinated water, and other chemicals present in a spa setting. Such plastics and other materials are known in the art The foregoing detailed description of the preferred embodiments and the appended figures have been presented only for illustrative and descriptive purposes and are not intended to be exhaustive or to limit the scope and spirit of the invention. The embodiments were selected and described to best explain the principles of the invention and its practical applications. One of ordinary skill in the art will recognize that many variations can be made to the invention disclosed in this specification without departing from the scope and spirit of the invention.

LIST OF REFERENCE NUMERALS

10 cup holder
12 spa shell
14 base component
16 body
18 lens or light diffuser
20 first end of body
22 nut
24 decorative or functional stencil or insert
26 light source
28 light holder
30 trim ring
32 mounting surface
34 second end of body
36 thread
38 gasket
40 hole
42 exterior of spa
44 hollow interior of body
46 interior side of spa shell
48 cup holder area
50 outer gripping surface
52 inner thread
54 slot or notch
56 inner surface of hollow interior
58 light transmitting portion
60 light opaque portion
62 first color portion
64 second color portion
66 threaded portion
68 conical portion
70 tubular structure
72 drain holes
74 outer circumferential portion
76 inner circumferential portion
78 cup

What is claimed is:

1. A lighted cup holder comprising:

a base component having a cylindrical body for mounting through a spa shell, the body having a first end, a second end, and a hollow interior, wherein the base component is formed at least partially out of a transparent, semi-transparent, or translucent material capable of transmitting light, and wherein the second end of the body is open, allowing access to the hollow interior of the body;

a lens or light diffuser at the first end of the body and located proximal to an exterior surface of a spa shell, wherein the lens or light diffuser is attached normal to the first end of the body, thereby closing the first end of the body and forming a closed end;

a decorative or functional stencil or insert located within the hollow interior of the body at or proximal to the first end of the body;

a light source; and a light holder for retaining the light source on the base component at or proximal to the second end of the body, wherein the hollow interior of the body is closed to the exterior of a spa and open to the interior side of a spa shell, whereby the hollow interior of the body is not exposed to or in fluid communication with an environment present proximal to exterior of a spa, whereby the insert is not exposed to the environment present proximal to exterior of a spa.

2. The lighted cup holder as claimed in claim 1, wherein the base component is a one piece component.

3. The lighted cup holder as claimed in claim 2, wherein the lens or light diffuser is a planar component.

4. The lighted cup holder as claimed in claim 1, wherein the insert is not subjected to degradation caused by a spa environment and the insert has a longer lifetime.

5. The lighted cup holder as claimed in claim 1, wherein the body has an exterior surface that has a thread or threaded surface over at least a portion of the exterior surface for cooperating with a nut for securing the cup holder onto a spa shell 12.

6. The lighted cup holder as claimed in claim 5, wherein the thread or threaded surface cooperates with the light holder for securing the light holder onto the body.

7. The lighted cup holder as claimed in claim 3, wherein the body further comprises a circumferential slot or notch located on an inner surface of the hollow interior of the body at or proximal to the first end of the body and juxtaposed to the lens or light diffuser, wherein the slot or notch is for securing the decorative or functional stencil or insert within the body.

8. The lighted cup holder as claimed in claim 3, wherein the body has a diameter and the lens or light diffuser has a diameter or minimum planar dimension that is larger than the diameter of the body whereby a mounting surface is created on an underside of the lens of light diffuser.

9. The lighted cup holder as claimed in claim 2, wherein the decorative or functional stencil or insert provides decoration or functional information to the cup holder, wherein the decorative or functional insert is placed within the hollow interior of the body so that the decorative or functional insert is located at or proximal to the first end of the body and against an interior side of the lens or light diffuser.

10. The lighted cup holder as claimed in claim 9, wherein the decorative or functional insert is a circular structure having a diameter approximately equal to an inner diameter of the hollow interior of the body and a thickness of up to ⅛".

11. The lighted cup holder as claimed in claim 10, wherein the decorative or functional insert comprises a light transmitting portion and a light opaque portion, wherein light will travel through the light transmitting portion and be visible to the user.

12. The lighted cup holder as claimed in claim 10, wherein the decorative or functional insert comprises a first color portion and a second color portion, wherein when light travels through the first color portion and the second color portion, designs of different colors will be visible to the user.

13. The lighted cup holder as claimed in claim 6, wherein the light holder has a generally conical or funnel shape with a threaded portion, a conical portion, and a tubular structure for containing and/or supporting the light source, wherein the threaded portion has an outer gripping surface and an inner threaded surface for cooperating with the external thread on the exterior surface of body, the tubular structure is structured to contain the light source, and the conical portion tapers from a first diameter proximal to the threaded portion such that the threaded portion can cooperate with the body to a second diameter proximal to the tubular structure.

14. The light cup holder as claimed in claim 1, further comprising a trim ring surrounding the lens or light diffuser wherein a portion of the trim ring is located between the lens or light diffuser and the exterior surface of a spa shell.

15. The lighted cup holder as claimed in claim 14, wherein the trim ring has a thickness greater that a height that the lens or light diffuser extends upwards from the exterior surface of a spa shell whereby the trim ring provides a curb for maintaining a cup on the cup holder.

16. A method for illuminating a cup holder on a spa, comprising:

supplying a cup holder comprising a base component having a cylindrical body for mounting through a spa shell, the body having a first end, a second end, and a hollow interior; a lens or light diffuser at the first end of the body and located proximal to an exterior surface of a spa shell; a decorative or functional stencil or insert located within the hollow interior of the body at or proximal to the first end of the body; a light source; and a light holder for retaining the light source on the base component at or proximal to the second end of the body;

inserting the body of the base component through a hole in a spa shell from the exterior of a spa such that a mounting surface of the lens or light diffuser contacts the exterior side of a spa shell;

screwing a nut onto the screw thread on an exterior surface of the body;

tightening the nut up against an interior side of a spa shell such that a spa shell is sandwiched between the nut and the mounting surface;

inserting the decorative or functional insert into body;

attaching the light holder to the second end of the body; and inserting the light source is inserted into the light holder.

17. The method for illuminating a cup holder on a spa as claimed in claim 16, wherein when the cup holder is mounted on a spa shell, the second end of the body is located within a spa shell enclosure and the first end of the body is located external to and proximal to a spa shell.

18. The method for illuminating a cup holder on a spa as claimed in claim 17, further comprising placing a gasket over the body and up against the mounting surface and/or placing a trim ring over the body and up against the gasket and/or the mounting surface.

* * * * *